(12) United States Patent
Matthias

(10) Patent No.: US 8,383,259 B2
(45) Date of Patent: Feb. 26, 2013

(54) SAFETY DEVICE FOR AN ACCUMULATOR CELL

(75) Inventor: Wolf Matthias, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 545 days.

(21) Appl. No.: 12/622,450

(22) Filed: Nov. 20, 2009

(65) Prior Publication Data

US 2010/0068606 A1 Mar. 18, 2010

(30) Foreign Application Priority Data

Nov. 20, 2008 (DE) .......................... 10 2008 043 946

(51) Int. Cl.
*H01M 2/00* (2006.01)
*H01M 2/02* (2006.01)
*H01H 85/00* (2006.01)
*H01H 13/00* (2006.01)

(52) U.S. Cl. ............ 429/61; 429/59; 429/163; 429/170; 429/179; 200/61.08; 200/334

(58) Field of Classification Search .............. 429/57–59, 429/61, 163, 170, 179; 200/61.08, 334
See application file for complete search history.

(56) References Cited

U.S. PATENT DOCUMENTS

2001/0010876 A1* 8/2001 Azema ............................. 429/61
2004/0110061 A1 6/2004 Haug et al.

FOREIGN PATENT DOCUMENTS

EP 1079450 2/2001
WO WO9410712 5/1994

* cited by examiner

*Primary Examiner* — Basia Ridley
*Assistant Examiner* — Jonathan G Leong
(74) *Attorney, Agent, or Firm* — Merchant & Gould P.C.

(57) ABSTRACT

In the case of a safety device for an accumulator cell, which has an electrode assembly disposed in an elastic cell sheath and at least one electrical connector, a blocking element is provided which blocks at least a first electrical contact associated with the electrical connector with at least a second electrical contact in a releasable electrical connection, the blocking element being configured for the purpose of releasing the releasable electrical connection when the cell sheath expands as a result of a change in volume of the accumulator cell during operation. A separation of the second contact from the first contact is thereby made possible.

9 Claims, 2 Drawing Sheets

SAFETY DEVICE FOR AN ACCUMULATOR CELL

This application is a claims benefit of Ser. No. 10 2008 043 946.0, filed 20 Nov. 2008 in Germany and which application is incorporated herein by reference. To the extent appropriate, a claim of priority is made to the above disclosed applications.

TECHNICAL FIELD

The present invention relates to a safety device for an accumulator cell, which has an electrode assembly disposed in an elastic cell sheath and at least one electrical connector.

BACKGROUND

Accumulators as a rule consist of a plurality of accumulator cells, which together are connected to packs or modules, from any desired type of accumulator, such as, for example, NiCd, NiMh and Li-ion, and are therefore also designated as an accumulator pack or an accumulator module. In particular accumulators with Li-ion cells are widely used on the basis of their high specific capacity as well as their high specific energy content. Li-ion cells, as they, for example, are used in electrical tools, are typically configured as round cells with a rigid metal cylinder, which is sealed with a cover which forms a terminal of the cell. Because an excess of pressure can arise when gas forms during the operation of such Li-ion round cells on account of electrochemical processes inside the cell, for example in the case of an electrical overload, the Li-ion round cells can be equipped with suitable safety devices. Provision, for example, can be made for a safety valve in the cover of said cells, which opens to blow off vaporizing electrolyte when excess pressure occurs, and/or a bursting disc, which is ruptured when excess pressure occurs and an associated electrical connection in the round cell is interrupted.

The Li-ion round cells have an increase in their overall mass, which does not contribute to providing energy, on account of the mass of their metal cylinder; and their round construction leads to dead construction volume in corresponding accumulator packs or modules. Because of these two factors, it is known from the technical field to revert back to so-called "lithium polymer" cells (LiPo cells) in order to avoid this increase in both mass and dead construction volume. These typically have electrode assemblies, which consist of platelet-like electrodes stacked on top of each other. Said electrodes are respectively separated from each other by suitable separators and are disposed in an elastic cell sheath. Such LiPo cells are as a rule prismatic and can consequently be disposed in the housing of an associated accumulator pack or module in order to save space.

The disadvantage in the technical field is that in contrast to a rigid metal cylinder, the elastic cell sheath expands when a change in volume of the accumulator cell occurs, for example when gas forms as described above, on account of the emergence of excess pressure. This expansion of the cell sheath takes place however without a controllable pressure build-up, which is required to release one of the safety devices described above, and can lead to the damage or destruction of the cell sheath and consequently of the cell, respectively of an associated accumulator pack or module.

SUMMARY

It is therefore a task of the invention to provide a safety device, which allows for the electrical circuit, which is associated with an accumulator cell with an elastic cell sheath, to be interrupted when excess pressure occurs inside the cell. In this way, damage to or destruction of the cell sheath and consequently the accumulator cell is avoided during operation.

This problem is solved by a safety device for an accumulator cell, which has an electrode assembly disposed in an elastic cell sheath and at least one electrical connector. A blocking element is provided which blocks at least a first electrical contact, which is associated with the electrical connector, with at least a second electrical contact in a releasable electrical connection. The blocking element is configured for the purpose of releasing the releasable electrical connection when an expansion of the cell sheath occurs during operation as a result of a change in volume of the accumulator cell. Thus, a separation of the second contact from the first contact is made possible.

The invention consequently allows for an electrical circuit which is closed by the releasable electrical connection of the first and second contacts to be interrupted when an excess of pressure occurs inside the cell and consequently when an expansion of the cell sheath occurs as a result of an electrical overload of the accumulator cell. In so doing, the invention allows for the cause of the overload to be removed.

Provision is preferably made for a supporting frame which has a retaining element for holding the blocking element, the retaining element holding the blocking element in a predetermined initial position to form the releasable electrical connection. The second electrical contact is preferably of resilient configuration and is pushed by a contact pressure exerted by the blocking element in the direction of the first contact with a predetermined preload. The second electrical contact springs away from the first electrical contact by means of the predetermined preload when the releasable electrical connection is released.

A simple and cost effective safety device can thus be provided for an accumulator cell with an elastic cell sheath. With said device, a reliable separation of the first and second contacts is achieved when the cell sheath expands.

According to one embodiment, the supporting frame consists of an elastic material and is fixedly connected to the cell sheath. In this case, the supporting frame is configured for the purpose of elastically deforming when the cell sheath expands in order to allow the blocking element to release the releasable electrical connection.

The invention thereby allows for a safety device with a simple construction to be provided, wherein the cell sheath acts on the blocking element via the supporting frame when an expansion occurs.

According to a further embodiment, the supporting frame has a predetermined number of spacers, which space the supporting frame apart from the cell sheath. In so doing, an actuator is provided which is configured for the purpose of actuating the blocking element to release the releasable electrical connection when an expansion of the cell sheath occurs.

A release of the releasable electrical connection can therefore be achieved using a cost effective auxiliary element when the supporting frame is substantially rigid.

The blocking element can have a predetermined breaking point and be configured for the purpose of breaking at the predetermined breaking point to release the releasable electrical connection when the cell sheath expands. As an alternative to this, the retaining element can be configured for the purpose of latching the blocking element as well as for allowing the blocking element to unlatch in order to release the releasable electrical connection when the cell sheath expands.

The invention consequently makes a simple and cost effective configuration of the blocking element as well as the retaining element possible.

According to one embodiment, the supporting frame has at least one fastener for affixing the first electrical contact in the supporting frame.

The first electrical contact can therefore be reliably and stably held in the supporting frame.

The accumulator cell is preferably a lithium polymer cell.

The problem mentioned at the beginning of the application is furthermore solved by an accumulator cell with an electrode assembly disposed in an elastic cell sheath and with at least one electrical connector, a safety device being provided for the overload protection of the accumulator cell. Said device has a blocking element, which blocks at least one first electrical contact, which is associated with the electrical connector, with at least one second electrical contact in a releasable electrical connection. The blocking element is configured for the purpose of releasing the releasable electrical connection during operation when the cell sheath expands as a result of a change in volume of the accumulator cell. A separation of the second contact from the first contact is thus made possible.

BRIEF DESCRIPTION OF THE DRAWINGS

The invention is explained in detail in the following description with the aid of an embodiment depicted in the drawings. The following are shown.

DETAILED DESCRIPTION

Figure 1:
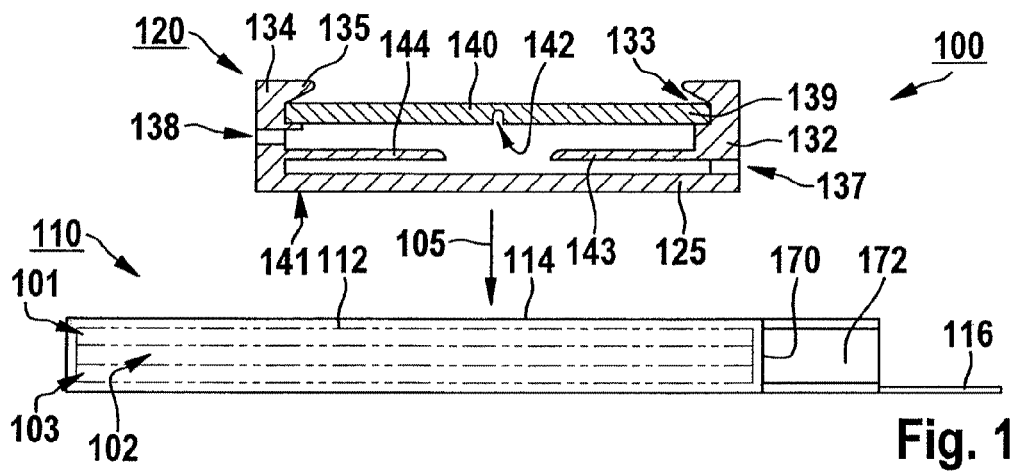
FIG. 1 is a sectional view of an apparatus with a safety device and an accumulator cell with an elastic cell sheath according to a first embodiment during installation of said device.

FIG. 1 shows an apparatus 100 with an accumulator cell 110, preferably a LiPo cell and a safety device 120 for the overload protection of the accumulator cell 110 according to a first embodiment. The accumulator cell 110 has an elastic cell sheath 114, whereupon the safety device 120 is affixed, as is indicated by an arrow 105. The cell sheath 114 is preferably configured from a plastic foil, which has an aluminum coating. A suitable plastic foil is, for example, constructed of three layers, an inner aluminum layer being provided between two outer plastic layers. These three layers are preferably welded to each other.

Provision is made for at least one electrical connector 116 to electrically contact the accumulator cell 110 with other accumulator cells to an accumulator pack or module, respectively for external contact-connection. Said connector 116 is connected in an electrically conductive manner to an electrode assembly 112 disposed in the cell sheath 114 and is led to and away from said assembly 112 via the cell sheath 114.

According to one embodiment, the electrode assembly 112 has two or more square, platelet-like electrodes, which in each case are separated from each other by suitable separators. Two electrodes 101, 103 which are separated from each other by a separator 202 are shown by way of example in FIG. 1. The electrode assembly 112 is preferably completely enclosed by the cell sheath 114, the cell sheath 114 having rabbets on all edges of the electrode assembly 112, which are preferably glued. On one edge 170 of the electrode assembly 112, the cell sheath 114 preferably has at least one rabbet-like extension 172, which extends away from the electrode assembly 112. For the sake of simplification, a depiction of the electrode assembly 112 is foregone in the following Figures.

The safety device 120 has by way of example one supporting frame 125 constructed from an elastic material with a retaining element. Said element preferably comprises two claw-like retaining members, which are disposed opposed to each other and are affixed to the supporting frame 125 and exemplary configure with said frame 125 an approximately U-shaped structure. According to an embodiment, the supporting frame 125 and the retaining members 132, 134 are manufactured as one piece from a plastic material.

Fasteners 143 respectively 144, which are configured pencil-shaped or platelet-like, are provided on the retaining members 132, 134. Furthermore, at least the retaining member 132 has a recess 133, for example a groove, for accepting, respectively clamping, an end region 139 of a blocking element 140 which, for example, is configured web-shaped. Said element 140 is disposed between the retaining members 132, 134 and exemplary has a predetermined breaking point 142. The retaining member 134 exemplary has a projection 135 for holding the blocking element 140. Furthermore, the retaining members 132, 134 have associated through-openings 137, respectively 138.

According to a first embodiment, the supporting frame 125 is affixed to the cell sheath 114 with a surface 141 facing toward the accumulator cell 110, which from now on for the sake of simplification is designated as the bottom side. The bottom side 141 is in this instance preferably glued to the cell sheath 114. It should, however, be noted that other fixing procedures can also be suitable as long as damage to the cell sheath 114 during installation of the safety device 120 is avoided.

Figure 2:
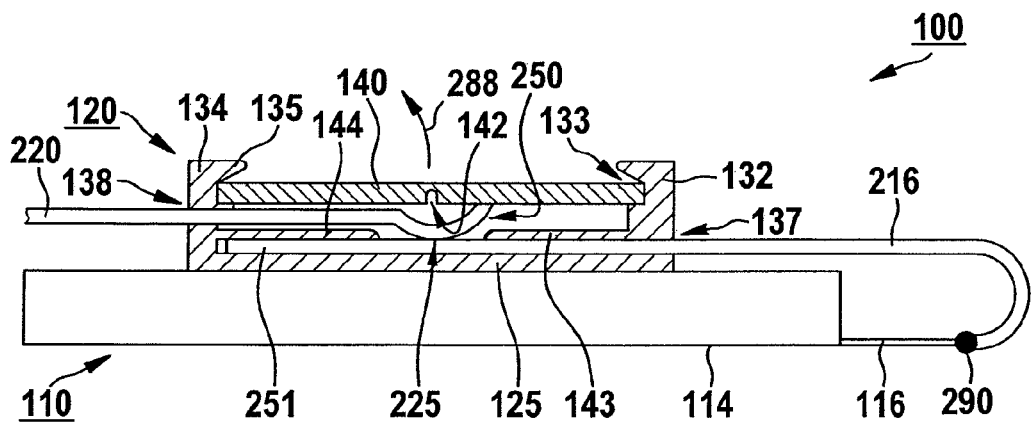
FIG. 2 is a sectional view of the apparatus of FIG. 1 after installation of said device.

FIG. 2 shows the apparatus 100 of FIG. 1 after the installation of the safety device 120 on the accumulator cell 110 in an initial, respectively blocking, position, in which the blocking element is disposed between the retaining members 132, 134 and is held on the one hand by the projection and on the other hand in the recess 133. In this initial position the blocking element 140 blocks a first electrical contact 251 and a second electrical contact 250 in a releasable connection 225.

The first electrical contact 251 is connected via the through-opening 137 to an end of a first connecting cable 216, whose other end is connected to the electrical connector 116 of the accumulator cell 110 at a connection point 290. The second electrical contact 250 is connected via the through-opening 138 to an end of a second connecting cable 220, whose other end, for example, is connected to an external contact or to an electrical connector of another accumulator cell, for example for interconnecting with the other accumulator cell to an accumulator pack or module.

It should be noted that the connecting cables 216, 220 are merely shown as an example and are not to be understood as a limitation of the invention. Other configurations are also likewise possible within the scope of the present invention. For example, the electrical contacts 251, 250 can be formed by end regions of the connecting cables 216, 220, which are inserted into the supporting frame 125 via the through-openings 137, respectively 138. The electrical connector 116 can also have a length which is suited to configuring the connecting cable 216 and the electrical contact 251.

According to one embodiment, the first electrical contact 251 is at least partially affixed with fasteners 143, 144 in the supporting frame 125, preferably clamped by said fasteners 143, 144, in order to prevent it from slipping out of the supporting frame 125. The second electrical contact 250 preferably has an elastic material and is of resilient configuration in the direction of an arrow 288. The second contact 250 is pushed in the direction of the first contact 251 with a predetermined preload by a contact pressure exerted by the blocking element 140 in its initial position, the releasable electrical connection 225 being thereby formed. In so doing, the second contact 250 can be clamped between the blocking element 140 and the fastener 144 in order to prevent it from slipping out of the supporting frame 125.

Figure 3:
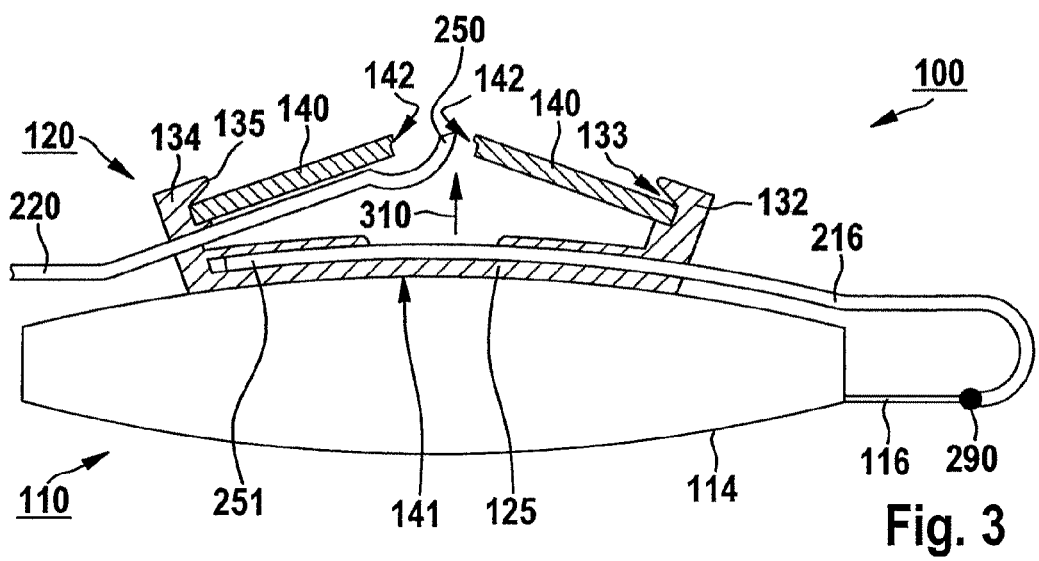
FIG. 3 is a sectional view of the apparatus of FIG. 2 when the safety device is released.

FIG. 3 shows the apparatus 100 of FIG. 2 in operation when a change in volume of the accumulator cell 110 occurs, which leads to an expansion of the cell sheath 114. In so doing, the supporting element 125 affixed to the cell sheath 114 is preferably elastically deformed in such a way that its bottom side 141 is substantially concavely bent.

When the supporting frame 125 deforms, the blocking element 140 held by the retaining members 134, 132 in the projection 135, respectively in the recess 133, breaks at the predetermined breaking point 142. In so doing, the releasable electrical connection (225 in FIG. 2) between the first and the second electrical contact 251, 250 is released so that the second electrical contact 250 springs away from the first electrical contact 251 in the direction of an arrow 310 by means of the predetermined preload. The releasable electrical connection (225 in FIG. 2) is consequently separated so that an electrical circuit, which is closed by said connection and is associated with the accumulator cell 110, is interrupted in order to prevent an electrical overload of the accumulator cell 110 during operation.

It should, however, be noted that the use of the predetermined breaking point 142 with the blocking element 140 is merely described as an example and not as a limitation of the invention. In fact other equivalent implementations within the scope of the present invention are also possible, with which a release of the releasable electrical connection can likewise be achieved. The retaining element comprising the retaining members 132, 134 can be configured for the purpose of latching the blocking element 140 in its initial position in order to then allow for an unlatching of the blocking element 140 to release the releasable electrical connection when the cell sheath 114 expands.

Figure 4:
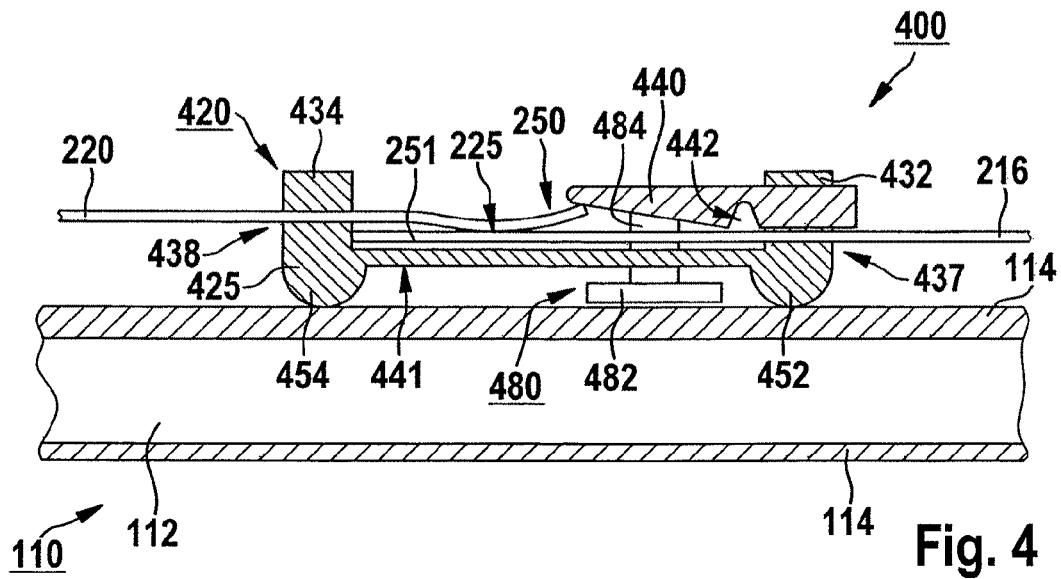
FIG. 4 is a sectional view of an apparatus with a safety device and an accumulator cell with an elastic cell sheath according to a second embodiment after installation of said device.

FIG. 4 shows an apparatus 400 with the accumulator cell 110 of FIGS. 1 to 3 and a safety device 420 with an actuator 480 according to a second embodiment. The safety device 420 has by way of example a supporting frame 425 constructed from an elastic material with a retaining element 432 and a transducing element 434, which are affixed to the supporting frame 425 and with said frame 425 embody by way of example an approximately U-shaped structure. According to one embodiment the supporting frame 425, the retaining element 432 and the transducing element 434 are manufactured as one piece from a plastic material.

The retaining element 432 and the transducing element 434 have associated through-openings 437, respectively 438, the first electrical contact 251 being connected to an end of the first connecting cable 216 via the through opening 437 and the second electrical contact 250 being connected to an end of the second connecting cable 220 via the through-opening 438 as described above in reference to FIG. 2. According to one embodiment, the through-opening 437 is dimensioned in such a way that a blocking element 440 with a predetermined breaking point 442, which is configured, for example, web-shaped, can be put through it, the blocking element 440 preferably clamping the connecting cable 216 in the opening 437.

In contrast to the supporting frame 125 of FIGS. 1 to 3, the supporting frame 425 has a predetermined number of spacers 452, 454, which space a bottom side 441 of the supporting frame 425 apart from the cell sheath 114 of the accumulator cell 110. These spacers 452, 454, which are depicted as protrusions on the bottom side 441 are preferably glued on their side facing the cell sheath 114 onto the cell sheath 114. It should, however, be noted that other fixing procedures can also be suitable as long as damage to the cell sheath 114 is avoided when installing the safety device 420. The safety device 420 can furthermore be affixed in an accumulator housing of an associated accumulator pack or module at a predetermined distance to the accumulator cell 110.

According to one embodiment, the actuator 480 has a push-rod 484 affixed to a support plate 482. In an initial, respectively blocking, position, said push-rod 484 abuts against the blocking element 440 with its free end without moving said element 440 out of its initial position. The support plate 482 preferably rests on the cell sheath 114 in a loose connection, can alternatively, however, also be affixed, for example glued, to said sheath 114. In this initial position, the blocking element 440 blocks the first and second electrical contact 251, 250 in the releasable electrical connection 225 as described with reference to FIG. 2.

Figure 5:
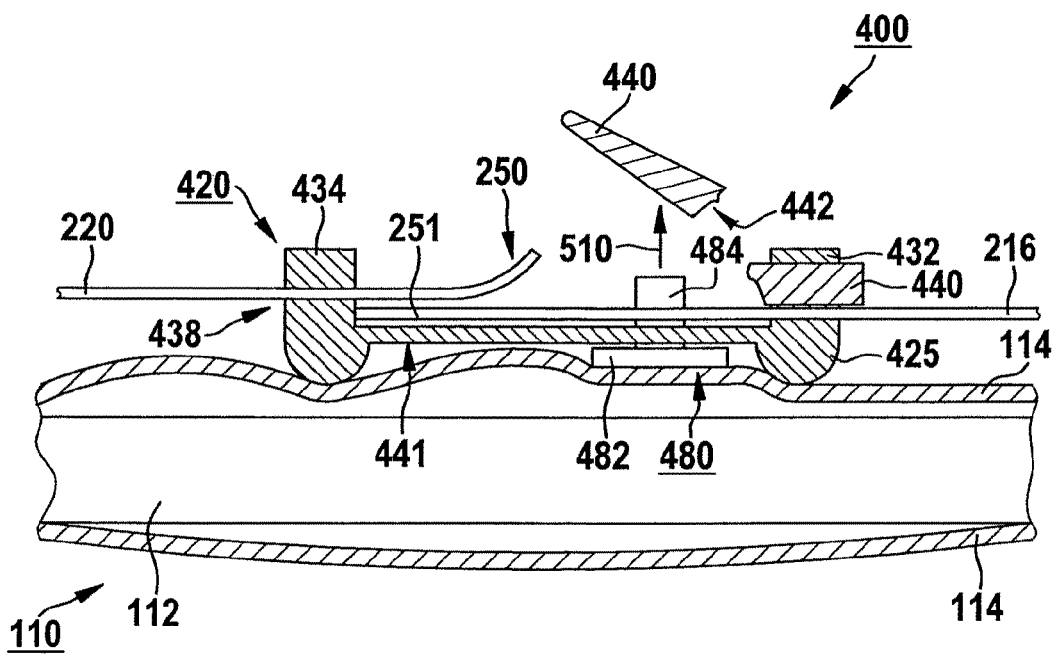
FIG. 5 is a sectional view of the apparatus of FIG. 4 when the safety device is released.

FIG. 5 shows the apparatus 400 of FIG. 4 during operation when a change in volume of the accumulator cell 110 occurs, which leads to an expansion of the cell sheath 114. In this case, the actuator 480 is pushed from the cell sheath 114 in the direction of an arrow 510 against the blocking element 440 in order to actuate it, the blocking element 440 being moved out of its initial position until it breaks at the predetermined breaking point 442. The releasable electrical connection (225 in FIG. 4) is consequently released between the first and the second electrical contact 251, 250 as described with reference to FIG. 3.

It should, however, be noted that the use of the predetermined breaking point 442 with regard to the blocking element 440 is likewise described by way of example and not as a limitation of the invention. As an alternative to this, the blocking element 440 can, for example, be embodied in such a way that it merely elastically deforms as a result of being moved by the actuator 480; and in so doing, the release of the releasable connection (225 in FIG. 4) is achieved.

The invention claimed is:

1. A safety device for an accumulator cell, which has an electrode assembly disposed in an elastic cell sheath and at least one electrical connector, wherein a blocking element is provided which blocks at least a first electrical contact associated with the electrical connector with at least a second electrical contact in a releasable electrical connection, the blocking element being configured for the purpose of releasing the releasable electrical connection when the cell sheath expands as a result of a change in volume of the accumulator cell during operation, wherein a separation of the second contact from the first contact is thereby made possible, wherein the second electrical contact is of resilient configuration and is pushed by a contact pressure exerted by the blocking element in the direction of the first electrical contact with a predetermined preload, the second electrical contact springing away from the first electrical contact by means of the predetermined preload when the releasable electrical connection is released.

2. The safety device according to claim 1, wherein a supporting frame is provided which has a retaining element for holding the blocking element, the retaining element holding the blocking element in a predetermined initial position to configure the releasable electrical connection.

3. The safety device according to claim 2, wherein the supporting frame comprises:
an elastic material and is fixedly connected to the cell sheath, the supporting frame being configured for the purpose of elastically deforming when the cell sheath expands in order to allow the blocking element to release the releasable electrical connection.

4. The safety device according to claim 2, wherein the supporting frame has a predetermined number of spacers, which space the supporting frame apart from the cell sheath, provision being made for an actuator, which is configured for the purpose of actuating the blocking element for the release of the releasable electrical connection when the cell sheath expands.

5. The safety device according to claim 2, wherein the blocking element has a predetermined breaking point, the blocking element being configured for the purpose of breaking at the predetermined breaking point for the release of the releasable electrical connection when the cell sheath expands.

6. The safety device according to claim 2, wherein the retaining element is configured for the purpose of latching the blocking element and allowing for an unlatching of the blocking element for the release of the releasable electrical connection when the cell sheath expands.

7. The safety device according claim 2, wherein the supporting frame has at least one fixing element for affixing the first electrical contact in the supporting frame.

8. The safety device according to claim 1, wherein the accumulator cell is a lithium polymer cell.

9. An accumulator cell with an electrode assembly disposed in an elastic cell sheath and at least one electrical connector, wherein a safety device is provided for the overload protection of the accumulator cell, which has a blocking element that blocks at least a first electrical contact associated with the electrical connector with at least a second electrical contact in a releasable electrical connection, the blocking element being configured for the purpose of releasing the releasable electrical connection when the cell sheath expands as a result of a change in volume of the accumulator cell during operation, wherein a separation of the second contact from the first contact is thereby made possible, wherein the second electrical contact is of resilient configuration and is pushed by a contact pressure exerted by the blocking element in the direction of the first electrical contact with a predetermined preload, the second electrical contact springing away from the first electrical contact by means of the predetermined preload when the releasable electrical connection is released.

* * * * *